July 24, 1928. 1,678,029
G. WIRRER
SELECTIVE CHANGE SPEED MECHANISM WITH TWO REVERSE GEARS
Filed May 5, 1927 2 Sheets-Sheet 1

INVENTOR:
GOTTFRIED WIRRER
BY Redding, Greeley, O'Shea & Campbell
HIS ATTORNEYS

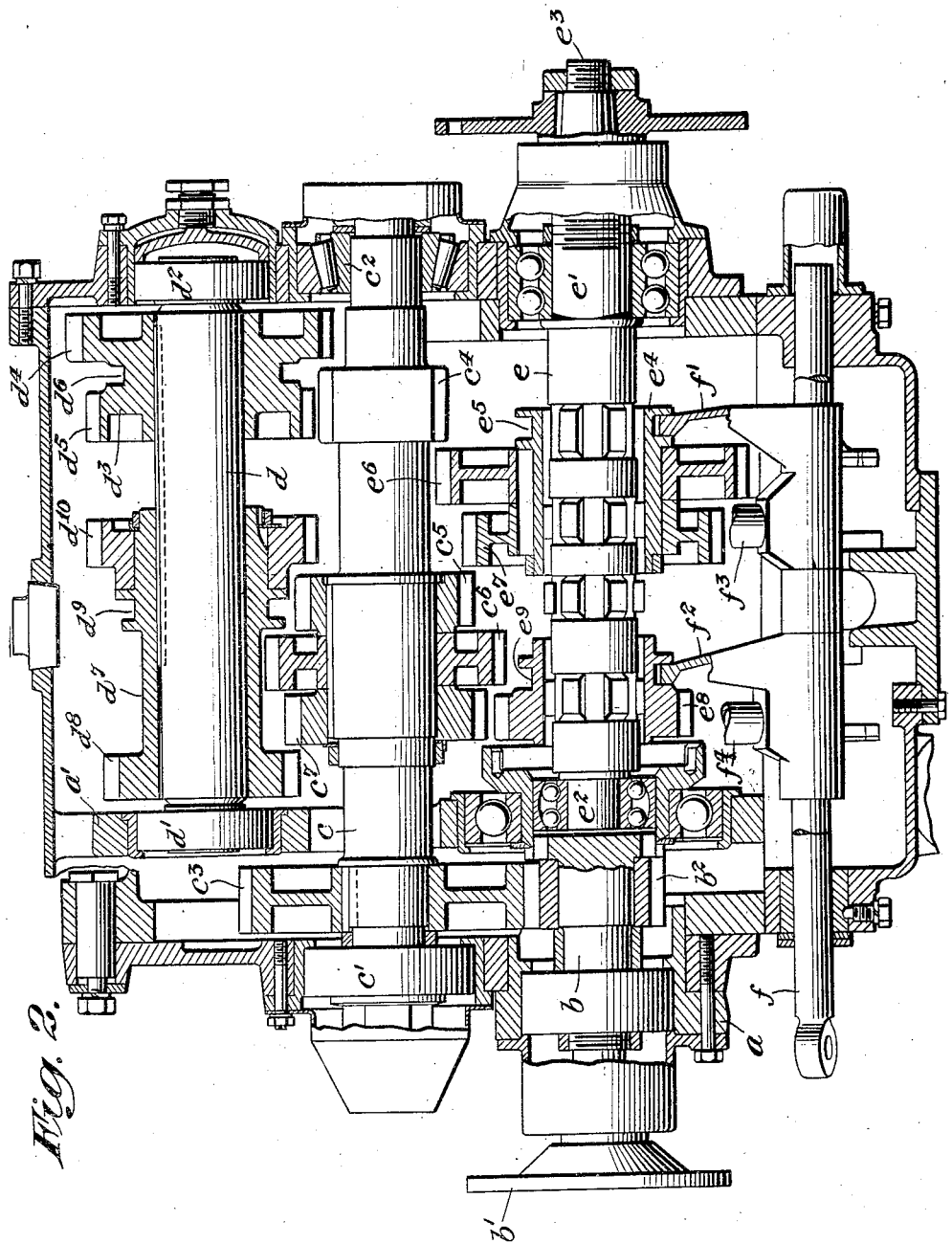

Patented July 24, 1928.

1,678,029

UNITED STATES PATENT OFFICE.

GOTTFRIED WIRRER, OF PLAINFIELD, NEW JERSEY, ASSIGNOR TO INTERNATIONAL MOTOR COMPANY, OF NEW YORK, N. Y., A CORPORATION OF DELAWARE.

SELECTIVE CHANGE-SPEED MECHANISM WITH TWO REVERSE GEARS.

Application filed May 5, 1927. Serial No. 188,899.

This invention relates to selective change speed transmission mechanisms and particularly to a change speed transmission which will be especially applicable to heavy duty vehicles, such as trucks. Such vehicles are generally provided with the usual four speed transmission having three speeds forward and one reverse. But it has been found in practice that such a transmission is not adapted to meet all the requirements met with in the use of heavy duty vehicles. Thus the problem is always present of balancing the gear ratios between conditions where a high degree of torque is demanded and conditions where a degree of speed, higher than that possible when a high degree of torque is being transmitted, is desired. This problem has been met, as far as forward motion of the vehicle goes, by supplying what are usually designated as low, second, and high speed gear changes. But in reverse usually only one speed has been supplied. It is an object of the present invention, therefore, to supply, in a change speed transmission of conventional design, means whereby the speed of the vehicle in reverse may be varied according as a greater or lesser degree of torque is required.

It has heretofore been proposed to vary the speed of a vehicle in reverse by coupling in a reverse gear ahead of all of the forward speed gears, so as to reverse their direction of rotation, and then shifting the forward speed gears to selectively vary the speeds in reverse. It has also heretofore been proposed to supply a transmission in which two speeds in reverse were possible independently of the forward speed gears. But such arrangements were not incorporated in transmissions of conventional design. It is, therefore, an object of the present invention to supply a conventional change speed transmission mechanism with an extra reverse gear, whereby the ordinary reverse gear will provide for situations in which maximum torque in reverse is desired while the extra reverse gear will provide for situations in which a lesser degree of torque and a higher speed in reverse is desired.

The invention may be more fully apprehended from the following detailed description. The description should be read in connection with the accompanying drawings, in which:

Figure 2 is a section taken along the line 2—2 in Figure 1 and looking in the direction of the arrows, the reverse shaft being swung upwardly through approximately 90° in the interest of clearness.

Figure 1:
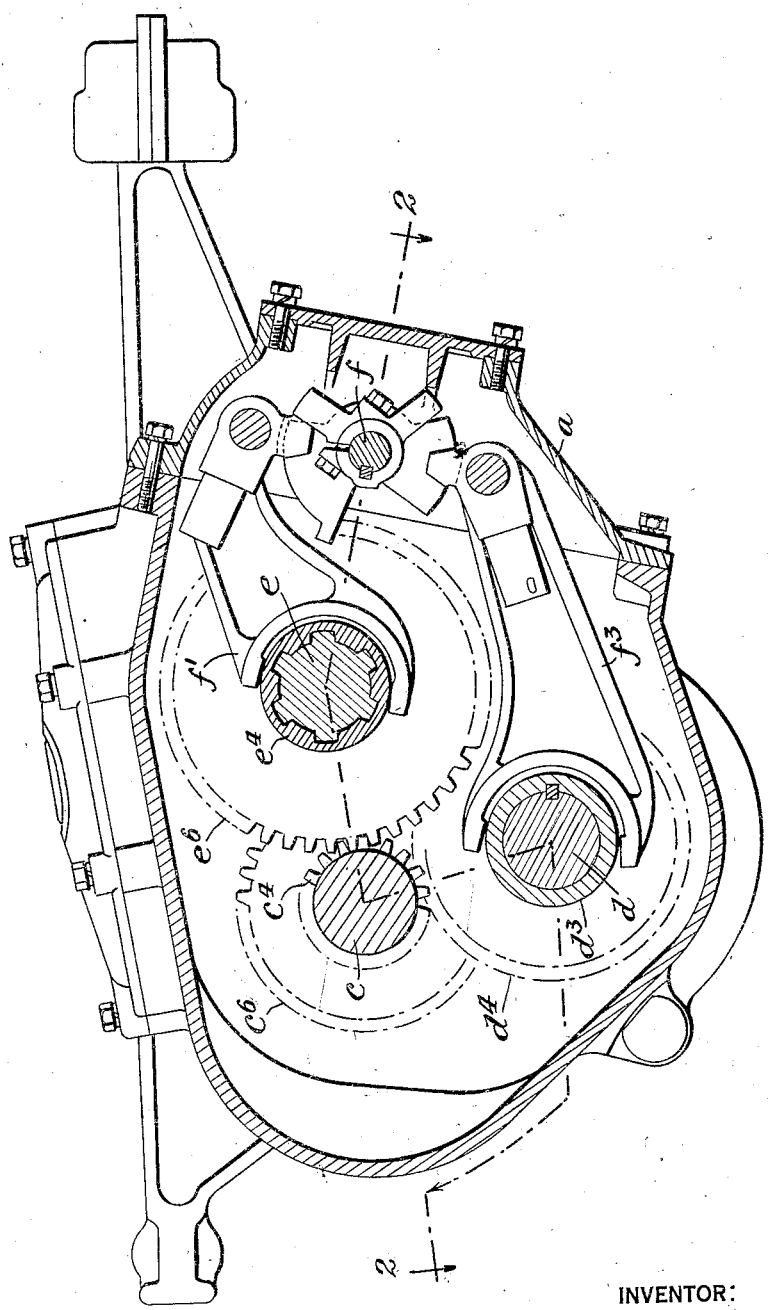
Figure 1 is a vertical section of a transmission to which the invention is adapted to be applied.

The transmission gearing illustrated in the drawings is of the conventional type having three speeds forward and one speed in reverse, except for the addition of gearing providing for an extra speed in reverse. The gearing which constitutes the conventional four speed transmission will be first described.

The transmission casing $a$ has journaled therein the shaft $b$ one end of which $b'$ is adapted for connection to the flywheel of the engine, and the other end of which has mounted thereon the gear $b^2$. The gear $b^2$ is always in mesh with the gear $c^3$ mounted upon the countershaft $c$ which is also journaled in the casing $a$ as at $c'$, $c^2$. The countershaft $c$ has formed thereon the spur gear $c^4$ and has fixedly keyed thereto the gears $c^5$ and $c^6$. The reverse shaft $d$ is journaled at its end $d^2$ within the casing $a$ and at its end $d'$ upon a bracket $a'$ formed with the casing $a$. Upon the reverse shaft $d$ is slidably keyed the collar $d^3$ which is formed with two gears $d^4$ and $d^5$ of different diameters. Between the gears $d^4$, $d^5$, the collar is formed with a peripheral slot or recess $d^6$ for the reception of a shifter fork. The splined shaft $e$ is journaled as at $e'$ within the casing $a$ and at its end $e^2$ with the bracket $a'$, being adapted at its end $e^3$ for connection to the transmission shaft for the rear wheels. The splined shaft $e$ has slidably mounted thereon the collar $e^4$ which is formed with a peripheral slot $e^5$ for a shifter fork $f'$. Upon the collar $e^4$ are keyed the gears $e^6$ and $e^7$. The splined shaft $e$ also carries slidably the gear $e^8$ which is formed with the peripheral slot $e^9$ for the shifter fork $f^2$. Besides the forks $f'$, $f^2$ the rock shaft $f$, which is capable of both axial and rotational movements, carries the rod $f^3$ which has formed thereon a fork which fits in the peripheral slot $d^6$ on the collar $d^3$.

The gears as shown are in neutral position. In order to get into low gear the collar $e^4$ is slid to the right by means of the shifter fork $f'$ until the gear $e^6$ meshes with the gear $c^4$ on the countershaft $c$. To shift into second the collar $e^4$ is slid to the left along the shaft $e$, disengaging the gears $c^4$, $e^6$, until the gear $e^7$ meshes with the gear $c^5$ on the countershaft $c$. To shift into high, the gears $c^5$ and $e^7$ are disengaged by sliding the collar $e^4$ to the right into neutral position, and the gear $e^8$ is then slid into engagement with the gear $c^6$ by means of the shifter fork $f^2$. In order to shift into reverse, the gears $e^6$, $e^7$ and $e^8$ being in neutral position, the collar $d^3$ on the reverse shaft $d$ is slid to the left, by means of a shifter fork on the rod $f^3$, until the gear $d^4$ meshes with the gear $c^4$ on the countershaft $c$. In this position the gear $d^5$ will mesh with the gear $e^6$ which is carried with the splined shaft $e$.

The arrangement above described constitutes a conventional type of change speed transmission having three speeds forward and one speed in reverse. In order to adapt this arrangement to provide for a change of speed in reverse the reverse shaft $d$ has slidably mounted thereon the collar $d^7$, which is formed with the gear $d^8$ and the peripheral slot $d^9$, and which has keyed thereto the gear $d^{10}$. The countershaft $c$ has also keyed thereto an additional gear $c^7$. In order to shift into the extra reverse speed, the remaining gears being in neutral position, the collar $d^7$ is slid to the right by means of a shifter fork carried with the rod $f^4$, which is mounted upon the rock shaft $f$, until the gear $d^8$ meshes with the gear $c^7$. In this position the gear $d^{10}$ will mesh with the gear $e^6$ on the splined shaft $e$.

Thus, in situations where a high torque is required in reverse, the gearing $d^4$, $d^5$ will be used, while the gearing $d^8$, $d^{10}$ may be used under conditions requiring a high speed. It will be seen that the gears $d^4$, $d^5$ are so proportioned that when they mesh, respectively, with the gears $c^4$, $e^6$ the speed in reverse will be even less than low speed forward and consequently a high degree of torque may be transmitted. The gears $d^8$, $d^{10}$ and $c^7$, however, are so proportioned that the speed in reverse when these gears are in mesh will be approximately the same as or a little greater than in second speed forward. This set of reverse gears will thus be useful under conditions in which a high degree of torque in reverse is not demanded.

It will be understood that, while the reverse shaft $d$ has been illustrated in Figure 2 as being in the same plane with the shafts $c$ and $e$, that this has been done merely in the interest of clearness and that the shaft $d$ is actually in such a position, as shown in Figure 1, with respect to the shafts $c$ and $e$ that the gears $d^5$ and $d^{10}$ may be made to mesh with the gear $e^6$ on the splined shaft $e$.

Thus there has been provided in a change speed transmission of conventional design having three speeds forward and one speed in reverse, means whereby an additional speed in reverse may be utilized under conditions where a high degree of torque is not demanded and where a greater degree of speed than is possible with the ordinary reverse gearing may be found desirable. The arrangement is simple and compact, requiring only the addition of two gears on the reverse shaft and one additional gear on the countershaft. No further structural changes in the conventional transmission, except for the addition of these gears, is necessary.

The several features of the invention are pointed out in the claims and no limitations are intended by anything which has been said in the description except as indicated in the claims.

What I claim is:

1. In a motor vehicle transmission of conventional design having a splined shaft, a countershaft, gears mounted thereon, a reverse shaft, sliding change speed gears mounted on certain of the shafts, means to cause the slidable gears to cooperate selectively with the gears on the countershaft for operation of the vehicle in a plurality of forward speeds and a reverse speed, means mounted on the reverse shaft and on the countershaft to provide selectively for an additional speed in reverse.

2. In a motor vehicle transmission of conventional design having a splined shaft, a countershaft, gears mounted thereon, a reverse shaft, sliding change speed gears mounted on certain of the shafts, means to cause the slidable gears to cooperate selectively with the gears on the countershaft for operation of the vehicle in a plurality of forward speeds and a reverse speed, means to provide for an additional speed in reverse comprising, an additional gear mounted on the countershaft, an additional gear mounted on the reverse shaft for cooperation selectively with the additional gear on the countershaft, and a gear carried with the additional gear on the reverse shaft for co-operation selectively with a gear on the splined shaft when the above-named selectively co-operating gears on the reverse and countershafts are in mesh.

3. In a motor vehicle transmission of conventional design having a splined shaft, a countershaft, gears mounted thereon, a reverse shaft, sliding change speed gears mounted on certain of the shafts, means to cause the slidable gears to cooperate selectively with the gears on the countershaft for operation of the vehicle in a plurality of forward speeds and a reverse speed, means to provide for an additional speed in reverse comprising an additional gear mounted on the countershaft, a collar carried with the reverse shaft, a gear carried with the collar for co-operation selectively with the additional gear on the countershaft, and a second gear carried with the collar for co-operation selectively with a gear on the splined shaft when the above-named selectively co-operating gears on the reverse and countershafts are in mesh.

4. In a motor vehicle transmission of conventional design having a splined shaft, a countershaft, gears mounted thereon, a reverse shaft, sliding change speed gears mounted on certain of the shafts, means to cause the slidable gears to cooperate selectively with the gears on the countershaft for operation of the vehicle in a plurality of forward speeds and a reverse speed, means to provide for an additional speed in reverse comprising, an additional gear mounted on the countershaft, a collar carried slidably with the reverse shaft, a gear carried with the collar, and a second gear carried with the collar whereby when the collar is slid along the reverse shaft until the first named gear carried with it meshes with the additional gear on the countershaft the second named gear carried with the collar will be brought into mesh with a gear on the splined shaft.

5. In a motor vheicle transmission having a splined shaft, a countershaft, a plurality of gears on the countershaft, sliding change speed gears mounted on the splined shaft for co-operation selectively with the gears on the countershaft for forward operation of the vehicle, a reverse shaft, a gear mounted on the reverse shaft for reverse operation of the vehicle, means to cause it to cooperate with forward gears on the splined and countershafts, a second gear mounted on the reverse shaft for reverse operation of the vehicle at a different speed, means to cause it to cooperate with the same forward gear on the splined shaft and a gear on the countershaft.

This specification signed this 30th day of April, A. D. 1927.

GOTTFRIED WIRRER.